US012679398B2

(12) United States Patent
Kunze et al.

(10) Patent No.: US 12,679,398 B2
(45) Date of Patent: Jul. 14, 2026

(54) METHOD FOR AUTOMATED VEHICLE LONGITUDINAL CONTROL AND AN ACCORDINGLY CONFIGURED ASSISTANCE SYSTEM AND MOTOR VEHICLE

(71) Applicant: Volkswagen Aktiengesellschaft, Wolfsburg (DE)

(72) Inventors: Alexander Kunze, Braunschweig (DE); Johanna Sandbrink, Braunschweig (DE); Yannis Tebaibi, Braunschweig (DE); Vitalij Sadovitch, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 134 days.

(21) Appl. No.: 18/672,883

(22) Filed: May 23, 2024

(65) Prior Publication Data

US 2024/0400082 A1      Dec. 5, 2024

(30) Foreign Application Priority Data

Jun. 5, 2023    (DE) ..................... 10 2023 205 240.7

(51) Int. Cl.
*B60W 50/14* (2020.01)
*B60K 35/23* (2024.01)
(Continued)

(52) U.S. Cl.
CPC ............. *B60W 50/14* (2013.01); *B60K 35/23* (2024.01); *B60K 35/28* (2024.01); *B60W 30/16* (2013.01);
(Continued)

(58) Field of Classification Search
CPC ................ B60W 50/14; B60W 30/16; B60W 2540/215; B60W 2554/802;
(Continued)

(56) References Cited

U.S. PATENT DOCUMENTS

| | | | | |
|---|---|---|---|---|
| 2011/0190961 A1 | 8/2011 | Giebel et al. ..................... 701/1 | | |
| 2012/0253628 A1* | 10/2012 | Maruyama .......... B60W 50/085 | | |
| | | 701/93 | | |

(Continued)

FOREIGN PATENT DOCUMENTS

| | | | | |
|---|---|---|---|---|
| CN | 107923520 A | * | 4/2018 | ............. F16H 59/44 |
| CN | 110949384 A | * | 4/2020 | ............. B60W 30/14 |

(Continued)

OTHER PUBLICATIONS

Israel, Boris et al., "Contact Analog Displays for ACC—in the Conflict Between Stimulation and Distraction," Conference Paper, 14 pages (German w/ English translation), Apr. 2010.

(Continued)

*Primary Examiner* — Chico A Foxx
(74) *Attorney, Agent, or Firm* — Slayden Grubert Beard PLLC

(57) ABSTRACT

The disclosure relates to a method for automatic longitudinal control of a motor vehicle and to a corresponding assistance system and a motor vehicle equipped therewith or, alternatively, configured accordingly. In the method, within the scope of user-side setting of a gap for the longitudinal control, a display position for displaying a relevant gap marker by means of a head-up display is determined proceeding from the position of a vehicle in front. In response to a user input for setting a changed new gap, the previous gap marker and the new gap marker are then initially displayed simultaneously by means of the head-up display at the corresponding display positions. When the longitudinal (Continued)

control has achieved the new gap, the head-up display is actuated to only display the new gap marker and not the previous gap marker anymore.

17 Claims, 4 Drawing Sheets

(51) Int. Cl.
    *B60K 35/28*       (2024.01)
    *B60W 30/16*       (2020.01)

(52) U.S. Cl.
    CPC ................ *B60K 2360/1868* (2024.01); *B60W 2050/146* (2013.01); *B60W 2540/215* (2020.02); *B60W 2554/802* (2020.02)

(58) Field of Classification Search
    CPC . B60W 2050/146; B60K 35/28; B60K 35/23; B60K 2360/1868
    See application file for complete search history.

(56) References Cited

U.S. PATENT DOCUMENTS

| | | | | |
|---|---|---|---|---|
| 2016/0059697 A1* | 3/2016 | Ann | ........................ | B60K 35/60 |
| | | | | 701/96 |
| 2016/0159351 A1* | 6/2016 | Lee | ........................ | B60K 35/80 |
| | | | | 701/93 |
| 2019/0294895 A1* | 9/2019 | Kleen | .................. | G01C 21/365 |
| 2019/0299855 A1* | 10/2019 | Ostapenko | ............ | B60W 30/16 |
| 2022/0074753 A1 | 3/2022 | Kunze et al. | | |
| 2022/0144083 A1* | 5/2022 | Seitz | ...................... | B60K 35/25 |
| 2022/0144296 A1* | 5/2022 | Seitz | ........................ | G06F 3/14 |
| 2022/0144297 A1* | 5/2022 | Seitz | ...................... | B60K 35/81 |
| 2022/0161657 A1* | 5/2022 | Seitz | ...................... | B60K 35/22 |
| 2022/0165039 A1 | 5/2022 | Kunze et al. | | |
| 2023/0036783 A1 | 2/2023 | Sakuma | | |
| 2023/0060810 A1* | 3/2023 | Hamabe | .............. | B60W 30/143 |
| 2025/0206138 A1* | 6/2025 | Tsuda | ................... | B60K 35/233 |

FOREIGN PATENT DOCUMENTS

| | | | | | |
|---|---|---|---|---|---|
| DE | 102008061649 A1 | | 12/2009 | | |
| DE | 102010052293 A1 | | 5/2012 | | |
| DE | 102011007329 A1 | | 10/2012 | | |
| DE | 102013016242 A1 | | 4/2015 | | |
| DE | 102014207398 A1 | * | 10/2015 | ............ | G08G 1/166 |
| DE | 102017208993 A1 | | 11/2018 | | |
| DE | 102018204254 A1 | | 9/2019 | | |
| DE | 102020211301 A1 | | 3/2022 | | |
| DE | 102020214843 A1 | | 6/2022 | | |
| EP | 1285808 A1 | * | 2/2003 | ............ | B60W 30/16 |
| EP | 3031656 B1 | | 6/2016 | | |
| JP | 2015219782 A | * | 12/2015 | | |

OTHER PUBLICATIONS

BMW Group, " Driver assistance: ACC Distance Adjustment," URL: https://www.youtube.com/watch?v=33DME4SHTSI, 2 pages, Jan. 31, 2022.

Brecher, Hannes, "Huawei Unveils an Innovative AR Head-Up Display for Cars," URL: https://www.notebookcheck.com/Huawei-enthuellt-ein-innovatives-AR-Head-Up-Display-fuer-Autos.559506.0.html, 4 pages (German w/ English translation), Jan. 31, 2022.

German Office Action, Application No. 102023205240.7, 4 pages, Feb. 28, 2024.

Extended European Search Report, Application No. 24174430.9, 5 pages, Nov. 13, 2024.

\* cited by examiner

METHOD FOR AUTOMATED VEHICLE LONGITUDINAL CONTROL AND AN ACCORDINGLY CONFIGURED ASSISTANCE SYSTEM AND MOTOR VEHICLE

CROSS-REFERENCE TO RELATED APPLICATIONS

This application claims priority to German Patent Application No. DE 10 2023 205 240.7, filed on Jun. 5, 2023 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The present disclosure is in the field of automotive engineering and relates to a method for automated longitudinal control of a motor vehicle. The disclosure further relates to an assistance system configured for a method of this kind and to a motor vehicle equipped with said assistance system.

Nowadays, motor vehicles already have a large number of various assistance functions which are intended to perform a wide variety of tasks, for example informing the driver or supporting the driver with guidance of the relevant vehicle or guiding the relevant vehicle in an at least partially automated manner. However, the activity of such assistance functions cannot always be readily perceived by the driver or rather a vehicle occupant or at least cannot always be easily recognized or rather monitored by them with minimal distraction. This can undermine trust in corresponding assistance functions, lead to false assumptions on the part of the driver with regard to the activity or state of assistance functions, and/or unnecessarily burden the driver cognitively or rather distract them from the surrounding traffic situation. The activity of assistance functions therefore should be conveyed better to the driver or rather vehicle occupants.

SUMMARY

A need exists to provide an automated longitudinal control of a vehicle with functions that are particularly easy to monitor for a vehicle occupant, such as for example with reduced distraction.

The need is addressed by the subject matter of the independent claim(s). Embodiments of the invention are described in the dependent claims, the following description, and the drawings.

DESCRIPTION

Figure 1A:
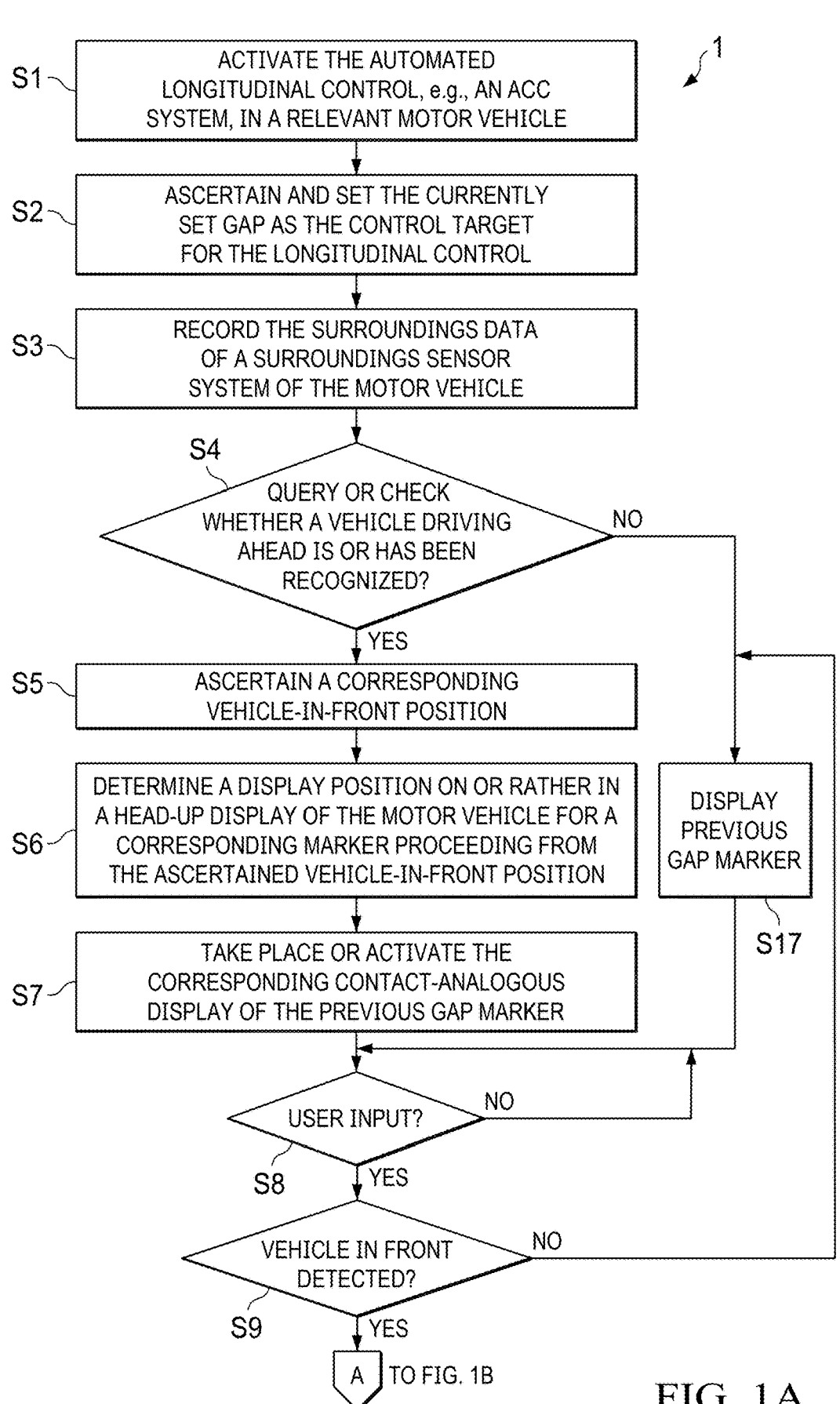
FIGS. 1A and 1B shows an example schematic partial flow chart for a method for longitudinal control operation of a motor vehicle.

The details of one or more embodiments are set forth in the accompanying drawings and the description below. Other features will be apparent from the description, drawings, and from the claims.

Features, benefits, and possible embodiments presented in the description in the context of one of the subject matters of the independent claims are to be regarded at least analogously as features, benefits, and possible embodiments of the respective subject matter of any other independent claim.

In the embodiments described herein, the described components of the embodiments each represent individual features that are to be considered independent of one another, in the combination as shown or described, and in combinations other than shown or described. In addition, the described embodiments can also be supplemented by features other than those described.

The method according to the teachings herein can be used for automated longitudinal control or rather within the scope of or as part of or for supporting automated longitudinal control of a motor vehicle. Automated longitudinal control of this kind can be carried out, for example, by means of adaptive cruise control or rather a system (e.g., an apparatus or processor) for adaptive cruise control (ACC). In some embodiments, a position of a vehicle in front driving ahead of the motor vehicle in the travel direction relative thereto is detected or rather ascertained continuously in the motor vehicle. Said position of the vehicle in front is, in this case, also referred to as the 'vehicle-in-front position'. The vehicle-in-front position may be ascertained, for example, by means of a surroundings sensor system of the motor vehicle, i.e., for example, by means of a camera and/or a radar apparatus and/or the like or based on sensor or rather surroundings data of a surroundings sensor system of this kind. Equally, in this case, "ascertaining" may mean, for example, that the vehicle-in-front position is received or called up, for example via a corresponding interface or from a corresponding data memory, for example by means of an assistance system that is configured accordingly. This can be carried out repeatedly on a continuous basis or, alternatively, at regular intervals. In some embodiments, the current vehicle-in-front position, i.e., for example, the vehicle-in-front position that was ascertained last or rather that is most recently available may then be used. In some embodiments, the vehicle in front may, in particular, be the vehicle driving immediately ahead of the motor vehicle in each case, i.e., without there being another vehicle between the motor vehicle and the vehicle in front.

In some embodiments, a display position for a gap marker that is analogous in terms of contact with the vehicle in front, in particular also with the road surface, is determined—for example also by means of the assistance system—proceeding from the ascertained vehicle-in-front position. The display position may be determined according to a gap from the vehicle in front currently set as the control target for the longitudinal control. In the present context, a gap of this kind may, for example, be a time gap or a distance gap. Furthermore, a head-up display (HUD) of the motor vehicle may then be actuated to display the gap marker at the correspondingly ascertained display position in a contact-analogous manner in relation to the vehicle in front, for example also in relation to the road surface. In other words, the gap marker may thus be displayed by means of the head-up display such that, visually or rather perspectively from the point of view of the driver of the motor vehicle, i.e., viewed from a driver position in the motor vehicle, it appears and remains in a fixed or rather constant relative spatial positional relationship permanently relative to the vehicle in front, for example also to the road surface. The gap marker can thus also serve as a marking of the recognized vehicle in front at least when the longitudinal control has adjusted the corresponding gap. The gap marker may, for example, be displayed such that it appears in a contact-analogous manner on or rather with respect to the road surface from the point of view of the driver, i.e., for example, so as to seemingly lie on the road surface or rather is depicted or rather appears thereon so as to move along in the travel direction of the motor vehicle.

The fact that the display position corresponds to the gap currently set as the control target may, in this case, mean that the apparent distance corresponds to the gap marker for the set gap displayed at the display position relative to the real vehicle surroundings or rather driving situation. If the gap is a time gap, the motor vehicle could, at a particular point in time at its current speed, thus reach the apparent position at which the gap marker appears at said point in time due to the depiction thereof at the particular display position, after a time corresponding to the set time gap has elapsed. If the gap is a distance gap, the gap marker may appear at the corresponding display position from the point of view of the driver at a distance from the motor vehicle that corresponds to the distance gap.

The gap marker may, for example, be designed or rather displayed as an elongated bar transversely to the travel direction or as a bracket partially surrounding the relevant vehicle in front or rather the rear thereof, or the like.

In some embodiments, in response to a user input for setting a changed new gap being detected, it is ascertained whether said new gap is smaller or larger than the previously set gap, and the new gap is set as the control target for the longitudinal control. Therefore, continuous monitoring for corresponding user inputs can be carried out during operation of the motor vehicle or rather of the assistance system configured according to the teachings herein. A user input of this kind may, for example, be done by the driver by correspondingly actuating a control element that may, for example, be coupled to the assistance system or be part of the assistance system. Furthermore, in response to such a user input being detected, a new display position that is shifted in accordance with the user input is determined proceeding from the current vehicle-in-front position and/or the previous, i.e., the previously ascertained, display position—and thus potentially indirectly also proceeding from the vehicle-in-front position. The new display position may thus be determined at least qualitatively according to the new gap defined by means of the user input or rather according to whether the new gap is smaller or larger than the previous gap. In order to determine the display positions, it is possible to predefine, for example, a corresponding calculation algorithm that takes account of or rather contains, as predefined parameters, the specific properties of the relevant head-up display as well as the arrangement thereof, for example relative to the driver position.

In some embodiments, the head-up display is then—for example also by means of the assistance system—actuated to display, in addition to the previous gap marker displayed at the previous display position, a new gap marker in a contact-analogous manner to the previous gap marker, in particular as also explained in a contact-analogous manner to the road surface, perspectively in front of or behind the previous gap marker so as to appear at the new display position from the point of view of the driver depending on the user input. From the point of view of the driver, the new gap may thus appear, for example, in each case partially in front of, i.e., on this side of the previous gap marker, if the new gap is smaller than the previous gap, and behind, i.e., on the other side of the previous gap marker, if the new gap is larger than the previous gap. The previous gap marker and the new gap marker may be designed differently in this case. As a result, the driver can be conveyed the corresponding activity of the assistance system or rather longitudinal control in a particularly simple and intuitive manner and given optical feedback that can be detected in a particularly simple manner with minimal distraction and that indicates that the user input of the driver was recognized and implemented.

The new display position at which the new gap marker is displayed does not necessarily have to already correspond to the new gap, at least as long as the new gap has not yet been achieved, i.e., not yet set, by means of the automatic longitudinal control. Equally, neither the previous gap marker nor the new gap marker need to be displayed in a contact-analogous manner to the vehicle in front. Rather and in some embodiments, it can be displayed at least qualitatively to the driver by means of the new gap marker whether the gap, i.e., the distance between the motor vehicle and the vehicle in front, is being increased or reduced by the longitudinal control. On account of the contact-analogous visualization of the new gap marker with respect to the previous gap marker, this can be recognized by the driver particularly easily and with minimal distraction. For example, after a, for example larger, new gap has been set as the new control target, the previous gap marker can be displayed constantly at the same display position relative to the motor vehicle or rather from the point of view of the driver, even if, in order to achieve or rather set the new gap, the distance between the motor vehicle and vehicle in front changes, i.e., the vehicle in front moves away from the motor vehicle in this example.

Due to the fact that the new gap marker—while the automatic longitudinal control is setting, i.e., realizing, the new gap—does not yet have to be displayed or rather does not have to appear from the point of view of the driver at the distance, corresponding to the new gap, from the motor vehicle and accordingly not necessarily correctly in a contact-analogous manner to the vehicle in front, it can in some embodiments be ensured, for example, that the new gap marker is visible to the driver and does not extend out of the display region or the like. If the display position that corresponds to the new gap, for example determined proceeding from the vehicle-in-front position, is already in the display region of the head-up display visible to the driver with the corresponding user input for defining the new gap, the new gap marker can thus also already be displayed at said display position during the longitudinal control for achieving or rather setting the new gap. In the process, the vehicle-in-front position relative to the motor vehicle can change dynamically or rather continuously and thus the corresponding display position can also, for example, be dynamically or rather continuously redetermined accordingly. Equally, the new gap marker may be displayed, for example, in this manner at the display position that corresponds to the new gap and that is determined proceeding from the current vehicle-in-front position, as soon as the display position required for this is within the display region of the head-up display. Optionally, the display position of the new gap marker may be continuously shifted from the original new display position determined relative to the previous gap marker into the display position that is determined proceeding from the vehicle-in-front position and which is contact-analogous to the vehicle in front. As a result, the driver can always understand or rather track the corresponding longitudinal control process in a particularly simple and intuitive manner even with a restricted display region of the head-up display.

In some embodiments, when the longitudinal control achieves the new gap, i.e., has realized the distance, corresponding to the new gap, between the motor vehicle and the vehicle in front, the head-up display—for example also by means of the assistance system—is actuated to display only the new gap marker and not the previous gap marker anymore. For example, the previous gap marker can be faded out when reaching or when increasingly approaching the new control target. The new gap marker then takes the place of the single gap marker displayed prior to the user input and is accordingly displayed at the display position that is determined proceeding from the current vehicle-in-front position and that corresponds to the new gap. This means that the display situation that existed before the user input is restored with the new gap. For the next setting or adjustment procedure for the gap, the new gap that was set last is thus effectively the gap currently set, which becomes the previous gap with another user input for further changing the gap. By temporarily or transitionally displaying both gap markers, i.e., the respective previous gap markers and the new gap marker, it can be conveyed to the driver in a particularly simple manner with minimal distraction, i.e., to be understood with particularly low cognitive effort, that their user input was recognized and what effect their user input has or rather will have on the longitudinal control of the motor vehicle.

Due to the fact that the display position for the gap marker is determined here proceeding from the vehicle-in-front position, at least when the corresponding gap is set, the gap marker can be placed and held at this display position in a particularly stable and robust manner so as to appear in the respective real surroundings. This is because the vehicle-in-front position can be determined and tracked, i.e., followed, in a particularly precise, reliable, and stable manner by means of surroundings sensor systems available nowadays for motor vehicles. For example, the vehicle-in-front position determined in this manner can thus be used as a spatial anchor point or reference point for determining the display position, which point is known or rather localized more precisely, more stably, and more reliably than the respective surroundings or rather other surroundings details. For example, map data or environment models are often not available with the same spatial precision or resolution that makes it possible to determine and track the vehicle-in-front position. As a result, by using the vehicle-in-front position as the starting point, i.e., as the anchor or reference point for determining the display positions, it is possible to achieve an accordingly accurate and stable and thus corresponding steady and non-distracting visualization of the relevant gap marker and thus also of the functioning or activity of the longitudinal control.

For example, the previous gap marker can thus be displayed in a contact-analogous manner to the relevant vehicle in front. If another gap is then set by means of the user input, a distance or path corresponding to the new gap can be subtracted from or added to the vehicle-in-front position in order to determine an apparent position at which the new gap marker is to appear from the point of view of the driver. Equally, for this purpose, it is possible, for example, to calculate a distance or path that corresponds to the difference between the previous gap and the new gap and thus to calculate the corresponding apparent position for the new gap marker. In consideration of the properties or display parameters of the head-up display, the display position which results in the new gap marker appearing at the accordingly determined apparent position from the point of view of the driver or, for example, a predefined viewing position can then be ascertained. In particular if the new display position determined in this manner were to lie outside of the display region of the head-up display, the new display position for the new gap marker can also initially be displayed at a predefined distance from the display position of the previous gap marker. Said predefined distance may thus not depend on the actual difference between the previous gap and the new gap, except for the sign.

If, however, the display position for the gap marker were determined, for example, based on map data, said position would often typically appear in a less robust manner and therefore less precisely match details of the respective real surroundings. This could entail increased cognitive effort for understanding and potentially also cause greater uncertainty for the driver. Likewise, an alternative possible abstract display of the currently set gap, i.e., one which is, for example, not coupled in a contact-analogous manner to the respective real surroundings, for example by means of a corresponding scale or a corresponding numerical value or travel coding or the like, would also require increased cognitive effort for transmitting the corresponding abstract item of information relating to the time gap set onto or rather into the respective local surroundings, i.e., for a corresponding harmonization. Therefore, the driver would ultimately have less cognitive potential or rather attention for other aspects. As result of the teachings herein, the driver may therefore dedicate more attention or rather cognitive potential to the surrounding traffic situation and/or to other vehicle functions, which can ultimately contribute to improved safety when operating the motor vehicle or rather in the traffic situation as a whole.

Another benefit of the teachings herein is that, by using the vehicle-in-front position or rather the previous display position as the starting point for determining the display position with multiple possible or rather settable or selectable gaps, said gaps or, alternatively, corresponding messages or corresponding gap markers can all be displayed to the driver in a particularly reliable manner. This is not always reliably the case in previous solutions, for example due to the display being dependent on a current actual speed of the motor vehicle and a FOV position, i.e., the view point and thus the size of the driver. In contrast, the teachings herein allow for consistent and continuous display, i.e., accordingly robust visual feedback on the operation and activity of the corresponding assistance system or rather the longitudinal control. It is therefore possible, for example, to prevent the driver from being additionally cognitively burdened and distracted by an incomplete or unavailable or intermittent depiction or, for example, from having to direct their gaze and attention multiple times to the corresponding depiction. This can ultimately also contribute to increased safety in traffic.

The teachings herein also relate to an assistance system for a motor vehicle. The assistance system according to the teachings herein is configured to automatically and continuously detect or rather ascertain the current relative vehicle-in-front position of the vehicle in front driving ahead in the travel direction, in particular directly ahead. Furthermore, the assistance system may be configured to automatically determine, proceeding from said vehicle-in-front position, the display position for the gap marker that is analogous in terms of contact with the vehicle in front, for example also with the road surface, which display position corresponds to the gap, i.e., a time gap or distance gap, with respect to the vehicle in front currently set as the control target for the automatic longitudinal control of the motor vehicle, and to actuate a head-up display for displaying the gap marker at the ascertained display position in a contact-analogous manner with respect to the vehicle in front, for example also with respect to the road surface. The head-up display may be part of the assistance system or be coupled thereto, for example via an on-board power supply of the relevant motor vehicle in the intended installation position.

Furthermore, the assistance system may be configured to, in response to a user input for setting a changed new gap being detected, automatically determine the new display position, which is shifted in accordance with the user input, proceeding from the vehicle-in-front position and/or the previous display position. Furthermore, the assistance system may be configured to automatically actuate the head-up display to display, in addition to the previous gap marker displayed at the previous display position, the new gap marker at the new display position in a contact-analogous manner to the previous gap marker, in particular as explained also in a contact-analogous manner to the road surface, such that the new gap marker appears perspectively in front of or behind the previous gap marker from the point of view of the driver depending on whether the new gap is smaller or larger than the previous gap. Furthermore, the assistance system may be configured, when the longitudinal control achieves or rather realizes the new gap, to automatically actuate the head-up display to only display the new gap marker as the only gap marker at the display position determined proceeding from the current vehicle-in-front position and corresponding to the new gap and to no longer display the previous gap marker. In other words, the assistance system may thus be configured for the method according to the teachings herein or rather for use in the method according to the teachings herein. The assistance system may thus, in particular, be or correspond to the assistance system mentioned herein in connection with the discussed method.

In some embodiments, the assistance system is configured to actuate the head-up display and/or another display apparatus to display a predefined graphical representation of the respectively set gap when no vehicle-in-front position can be ascertained when longitudinal control is active. Said graphical representation cannot be displayed in a contact-analogous manner, in particular. Depending on the embodiment or application scenario, an instrument cluster or an infotainment screen of the motor vehicle or the like may be used or rather actuated as the other display apparatus. A situation where no vehicle-in-front position can be ascertained may arise, for example, when there is no vehicle in front or same cannot be reliably recognized, for example within the detection range of the surroundings sensor system used. The absence of reliable recognition may arise, for example, due to weather or environmental influences or due to the surroundings sensor system being damaged or concealed or the like. In such a case, the predefined graphical representation, which is in particular independent of the surroundings, can be used as a back-up solution. As described in connection with the method according to the teachings herein, the predefined graphical representation may, for example, be designed as a corresponding scale or as a numerical value or the like. The predefined graphical representation may, for example, be or comprise a 2D or 3D depiction. The predefined graphical representation may, for example, be displayed in a manner entirely independent of the surroundings. Equally, the predefined graphical representation may be displayed at a display position which—as mentioned in connection with the method according to the teachings herein—is determined, for example, based on a relevant 2D or 3D environment model. An environment model of this kind may be generated, for example, based on the respectively available sensor or surroundings data and/or using predefined environment or map data and/or the like. An environment model of this kind may, in particular, contain static surroundings objects, for example the road surface, the course of the road, lane markings, shoulders, and/or the like. As a result, the predefined graphical representation may potentially fit less precisely with the respective real surroundings than the gap marker displayed at the display position ascertained proceeding from the vehicle-in-front position, but the driver may still be given reliable visual feedback on their user inputs or rather the activity of the longitudinal control. In this way, it is possible for the driver to be involved in all situations.

In some embodiments, the assistance system is configured to actuate the head-up display in each case, during simultaneous depiction of the previous gap marker and new gap marker, to display these two gap markers with varying degrees of conciseness. For this purpose, the previous gap marker may, for example, be displayed in a relatively faded manner, i.e., faded in comparison with the new gap marker, or vice versa. Such fading or rather reduced conciseness may, for example, be achieved by means of another color and/or another, in particular brighter, shade and/or a lower brightness and/or a lower intensity and/or a lower color saturation and/or a smaller size and/or a lower degree of filling of a relevant depiction surface and/or the like. This different depiction or rather conciseness may be maintained, for example, until the longitudinal control has achieved the new gap. Then, only the new gap marker may be displayed. For example, the depiction of the previous gap marker and/or new gap marker may be changed dynamically or rather gradually. This makes it possible to represent and illustrate the gradual realization or rather achievement of the new gap by the longitudinal control, i.e., its progress in the control or rather in achieving the control target, at least for the first time. The driver can therefore be given feedback, in a particularly simple and intuitive manner with minimal distraction, that the user input was recognized and how same is implemented.

In some embodiments, the assistance system is configured to actuate the head-up display in each case to gradually fade out the previous gap marker when the new gap has been realized or rather achieved by means of the longitudinal control. In other words, the display of the previous gap marker is thus not switched off or deactivated suddenly or abruptly. Rather, it can be faded out little by little by fading the intensity and/or brightness and/or color saturation and/or by reducing the size and/or by progressively reducing the degree of filling of the relevant depiction surface and/or the like. As a result, the driver can recognize, in a particularly simple and intuitive manner with minimal distraction at all points in time, which gap marker is the new gap marker and when or, alternatively, whether same has already been achieved or is already being achieved. This makes it possible, for example, to prevent the driver from becoming confused or rather being uncertain as to whether a single displayed gap marker is the new gap marker or the previous gap marker, i.e., whether their user input has been recognized and implemented, for example if they have not or not continuously directed their gaze or attention to the corresponding depiction during or after their user input. Equally, abruptly switching off or deactivating the previous gap marker, i.e., bringing about an accordingly sudden change in the depiction, can be distracting, which can also be prevented by means of the embodiments proposed here. Therefore, the driver can be prevented from being distracted or startled and thus safety is further improved.

In some embodiments, the assistance system is configured, in response to a first actuation of a control element intended for setting the gap being detected, i.e., in response to a corresponding first user input or user operation, to switch to an adjustment mode, firstly without changing the gap, i.e., without changing the control target of the longitudinal control. The assistance system is then further configured to actuate the head-up display in this adjustment mode to display a predefined indicator for the possibility of adjusting the gap. As a result, it can be made clear that the gap can be changed, in particular by means of a further user input. This can then be done in response to the detection of a second or rather further actuation of the control element, which is then detected as the user input for setting the changed new gap mentioned in connection with the method according to the teachings herein and the aforementioned assistance system according to the teachings herein. In this way, it is possible, for example, to prevent or at least render less probable a change to the gap caused by an unintentional operating error or rather actuation error and thus to prevent the driver from being distracted or unsettled.

In some embodiments, the assistance system is configured to determine all possible gaps in each case and to provide same for selection. For example, in principle, a certain perimeter or adjustment range may be provided, from which only some or a particular selection can actually be used in a particular situation. For example, a particularly small or short gap may only be possible, i.e., settable or rather selectable for the user, below a predefined speed of the motor vehicle. The gaps that are possible, i.e., settable or rather permissible, in the relevant situation can therefore be determined continuously or, alternatively, regularly. This can prevent the driver from attempting to set a gap that is not permissible, i.e., not possible, in the relevant situation. The latter case could result in the driver, for example, having to expend greater cognitive effort in order to monitor the reaction of the assistance system or rather longitudinal control and to understanding of their wish potentially not being granted and/or in the driver having to expend additional effort and devote additional concentration to setting another possible or rather permissible gap, which may also lead or contribute to the driver's attention being increasingly distracted from the surrounding traffic situation. Therefore, on account of the embodiments proposed here, it can be achieved or rather ensured that the driver is able to set a gap which can actually also be realized, with minimal cognitive effort and minimal operating effort.

In some embodiments, the assistance system is configured, in each case in response to the or rather a first actuation of the control element intended for setting the gap being detected, i.e., in particular as early as with the switch to the adjustment mode mentioned at another point, to actuate the head-up display to simultaneously display all possible gaps that can be set in each case. In other words, the or rather a first user input that potentially precede the user input for actually setting or rather selecting the changed new gap can, in this case, be detected first as or in a manner similar to that described at another point. In this way, the driver is able to detect the settable gaps that are possible in the relevant situation particularly early on and quickly. Therefore, the driver can then make their selection particularly quickly and in a targeted manner and set the desired gap.

In some embodiments, the assistance system is configured to actuate the head-up display to display the possible gaps that can be set in each case only in response to the user input for setting the changed new gap being detected. In other words, in response to the corresponding user input, the changed gap can thus be set or rather selected or at least preset or rather preselected and the possible gaps that can also be set or rather selected in the relevant situation can also be displayed. This can be useful or serve to give the driver feedback on their user input in a particularly simple and understandable manner with minimal distraction and to signal to them that they have other setting options, for example in conjunction with the initially provided switch to adjustment mode described at another point. The potential additional visual distraction caused by the display in the other possible gaps may only occur if the driver is actually ready to set or rather select the desired gap. At this point in time, the distraction and the cognitive effort for detecting and processing the displayed possible gaps can then be reduced, since the driver is then already mentally prepared for this. Overall, an overlap or distraction that is reduced, or alternatively, minimized in terms of time and that is caused by other depicted information, i.e., so-called visual clutter due to the possible gaps, can be achieved.

Irrespective of the other embodiments, possible gaps that are available, i.e., can be set, in the relevant situation can be displayed differently than the previous gap marker, for example also differently than the respectively selected or set or, alternatively, preselected or preset new gaps. For example, the other possible gaps can, in each case, be displayed with reduced conciseness, as explained at another point.

The present disclosure also relates to a motor vehicle which is configured for automated longitudinal control of the motor vehicle and which comprises a head-up display. The motor vehicle may be configured to execute the method according to the teachings herein, in particular automatically or semi-automatically, and/or is equipped with the assistance system according to the teachings herein. The motor vehicle may thus, for example, be or correspond to the motor vehicle mentioned in connection with the aforementioned method and/or in connection with the aforementioned assistance system. The motor vehicle may thus also comprise some or all of the features mentioned in these connections, for example the surroundings sensor system or the like.

Other features of the invention are apparent from the following description of the FIGS. with reference to the drawings. The features and combinations of features mentioned in the preceding in the description, as well as the features and combinations of features presented in the following in the description of the FIGS. and/or just in the FIGS., can be used not only in the mentioned combination, but also in other combinations or by themselves without departing from the scope of the invention.

Specific references to components, process steps, and other elements are not intended to be limiting. Further, it is understood that like parts bear the same or similar reference numerals when referring to alternate FIGS.

In vehicles with automated longitudinal control, a relevant driver can typically set a gap, i.e., a time gap and/or distance gap with respect to a vehicle driving ahead. Corresponding gap adjustment can be communicated to the driver via 2D or 3D environment models or predefined graphics. However, in order to then transmit a corresponding depiction onto the real driving situation, a high cognitive performance may be required on the part of the driver. The cognitive effort in the context of the information processing on the part of the relevant driver or rather observer can be reduced by the contact-analogous depiction of the gap adjustment. However, with previous approaches, in many situations not all possible gaps can be reliably displayed, as a result of which operation cannot be continuously displayed. In addition, it may be possible to activate the gap adjustment in any driving situation and thus, in particular, in situations with limited or insufficient data accuracy regarding the respective surroundings. As a result, virtual depictions or displays are not always placed or rather virtually displayed in a stably and robustly contact-analogous manner in the respective surroundings, which can, in turn, result in an unsteady and thus potentially distracting display. However, this problem can be countered.

Figure 1B:
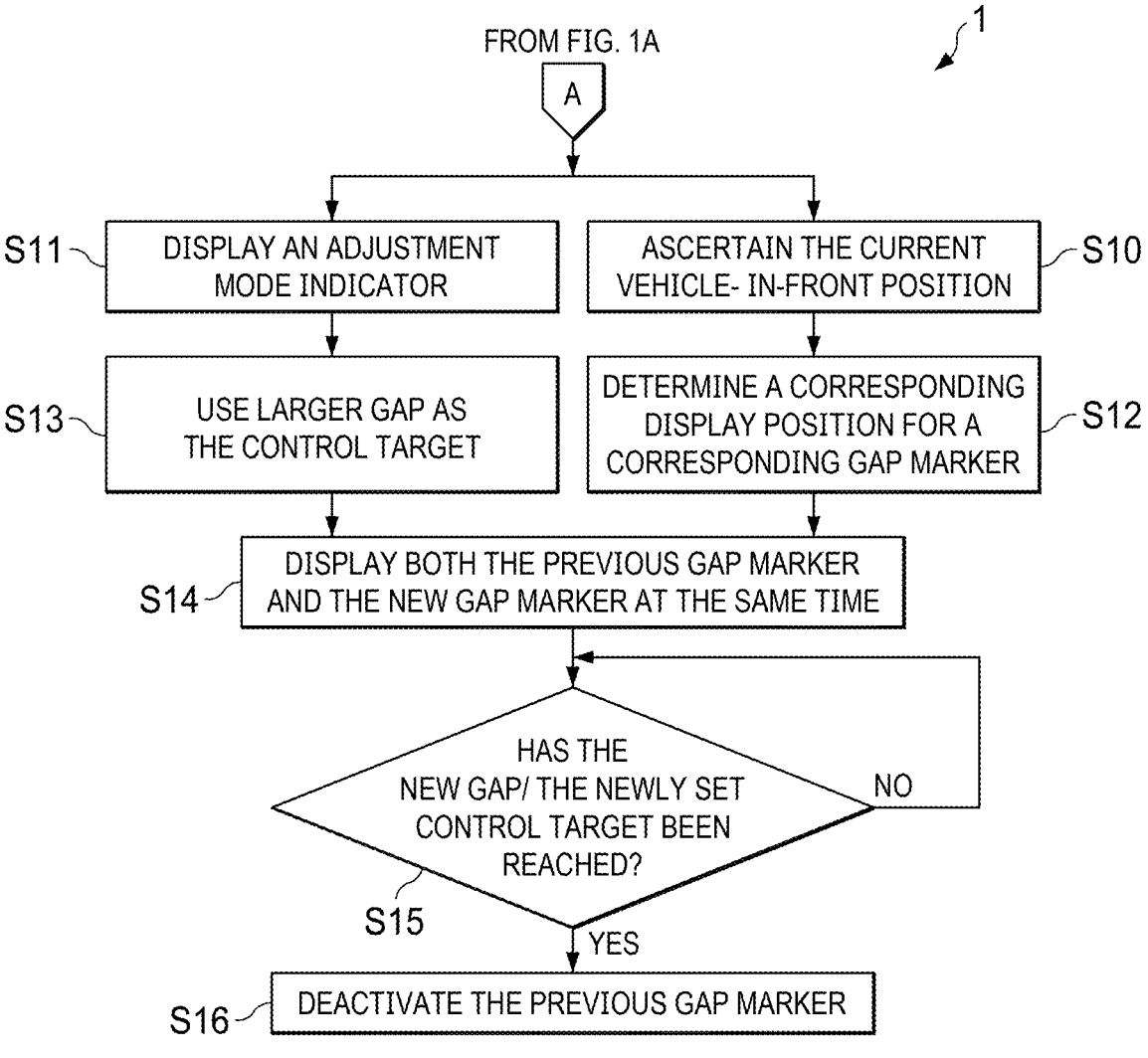

In this regard, FIGS. 1A and 1B shows an exemplary schematic flow chart 1 for a corresponding method. This is explained in more detail below with reference to the remaining FIGS.

In a method step S1, the automated longitudinal control, i.e., for example, an ACC system, can be activated in a relevant motor vehicle. In a method step S2, the currently set gap can then be ascertained and set as the control target for the longitudinal control.

In a method step S3, surroundings data of a surroundings sensor system of the motor vehicle can be recorded. Here, this is specifically to be understood for the longitudinal control or rather by the longitudinal control, since corresponding surroundings data can be continuously recorded during operation of the motor vehicle, for example also before or at the same time as the other method steps.

Figure 2:
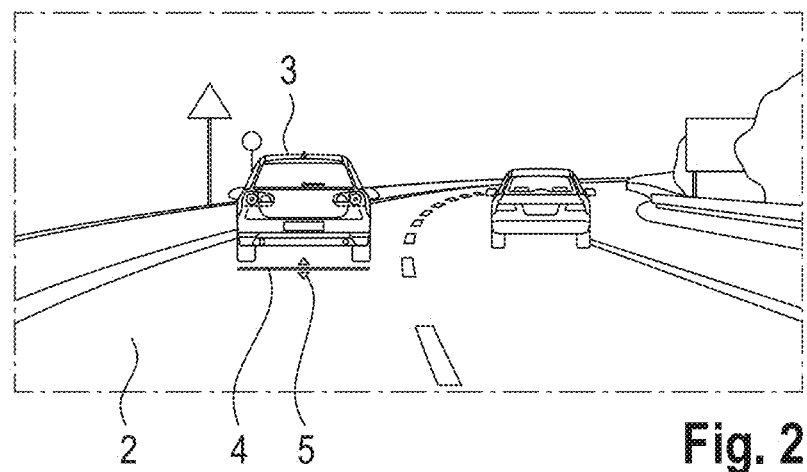
FIG. 2 shows a schematic depiction of an example traffic scene from the point of view of a driver of the motor vehicle at a first point in time.

In a method step S4, the recorded surroundings data are used to query or check whether a vehicle driving ahead is recognized or, alternatively, has been recognized. In this regard, FIG. 2 shows an exemplary schematic depiction of a traffic scene from the point of view of the motor vehicle, in which the method described here is carried out, at a first point in time. Here, a vehicle in is front 3 ahead of the motor vehicle. It is possible that the control by the longitudinal control is based on this vehicle in front 3. In other words, the gap with respect to said vehicle in front 3 that is set as the control target can be determined or, alternatively, maintained.

If such a vehicle in front 3 was recognized, which or rather the position of which can be used as the control target for the longitudinal control, a corresponding vehicle-in-front position, i.e., the position of the recognized vehicle in front 3, for example relative to the ego motor vehicle, can be ascertained in a method step S5.

In a method step S6, a display position on or rather in a head-up display of the motor vehicle for a corresponding marker can be determined proceeding from the ascertained vehicle-in-front position. A marker of this kind is depicted, by way of example, in FIG. 2 as the previous gap marker 4. This previous gap marker 4 can be used to mark the recognized vehicle in front 3 in a contact-analogous manner, for example at the rear lower edge thereof, such that said previous gap marker 4 thus follows the vehicle in front 3.

The corresponding contact-analogous display of the previous gap marker 4 can then take place or rather be activated in the method step S7.

In a method step S8, it is possible for monitoring for a user input to take place. If no such user input is recognized at a particular point in time or in a particular time step or rather checking step, the monitoring can be continued as indicated here by the curved path. A corresponding user input may take place, for example, by means of actuating a control button that is linked or rather coupled to the longitudinal control or rather gap adjustment. A control button of this kind may be arranged, for example, on the steering wheel of the motor vehicle. This can allow for operation or rather actuation that is as simple and distraction-free as possible.

If a user input of this kind is detected, it is possible, for example, to check again in a method step S9 whether the or rather a vehicle in front 3 is then detected. If this is the case, the current vehicle-in-front position thereof can be ascertained in a method step S10. In parallel, for example, an adjustment mode indicator 5 can be displayed in a method step S11. As a result, it can be made clear that the gap, i.e. the temporal and/or spatial distance from the vehicle in front 3, can then be changed by the driver. At the same time, it is possible to monitor for a corresponding further user input for changing the gap set, i.e. for selecting or setting a new gap.

Therefore, in response to a first user input, for example, the adjustment mode indicator 5 can be displayed first without changing the gap set. Then, only in response to a further user input, for example, i.e. when the control button is actuated again, for example, a corresponding further marker can be displayed in accordance with the user input perspectively spatially behind or in front of the previous gap marker 4. This makes it possible to signal that a corresponding increase or, alternatively, decrease in size of the gap is implemented.

Figure 3:
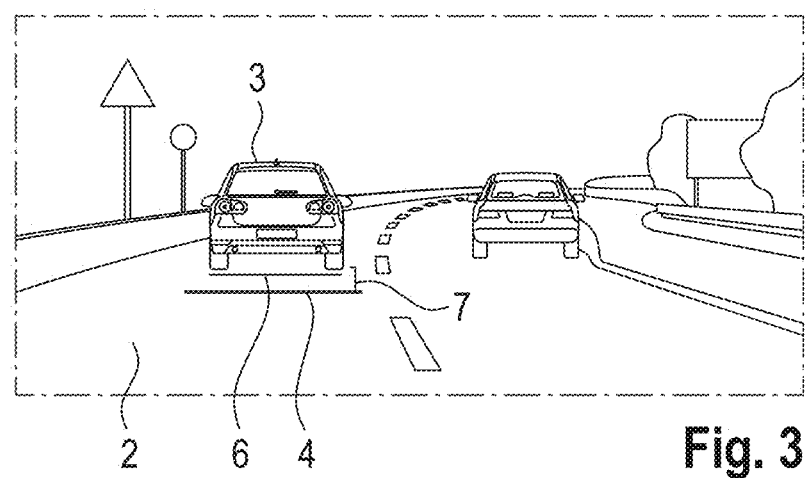
FIG. 3 shows a schematic depiction of the example traffic scene as seen at a later, second point in time.

If a new gap was set by means of a corresponding user input or rather the further user input by the relevant user or rather driver, a corresponding display position can be determined for a corresponding gap marker in a method step S12. In this regard, FIG. 3 is an exemplary schematic depiction of the traffic scene from FIG. 2 at an accordingly later, second point in time. Here, the previous gap marker 4 and a new gap marker 6 that is shifted relative thereto in accordance with the user input are depicted at the same time. The previous gap marker 4 may continue to be displayed so as to constantly appear at the corresponding distance from the motor vehicle in accordance with the previously set gap. However, since a larger gap was set by means of the user input in the present case and was, for example, set or rather used as the control target for the longitudinal control in parallel in a method step S13, the previous gap marker 4 no longer has to be depicted in a contact-analogous manner at or rather to the vehicle in front 3. When the user input for setting the new gap is detected, the previous gap marker 4 or rather the display position thereof can be fixed or rather decoupled from the vehicle in front 3 or rather from the vehicle-in-front position thereof. Therefore, when a larger new gap is set, for example, the vehicle in front 3 can move further away from the previous gap marker 4.

Since the newly set gap has not yet been achieved by means of the longitudinal control, the new gap marker 6 can, in this case, be depicted with reduced conciseness in comparison with the previous gap marker 4. Depending on the situation, the display position for the new gap marker 6 may be determined, for example, relative to the display position of the previous gap marker, at least as long as the new gap has not yet been achieved, i.e. set. The new gap marker 6 may, for example, be displayed or rather appear from the point of view of the driver so as to be analogous in terms of contact with the previous gap marker 4. Equally, the display position for the new gap marker 6 could, for example, be determined such that the new gap marker 6 initially appears at the distance, corresponding to the new gap, from the motor vehicle from the point of view of the driver. In this case, in particular, the display position for the new gap marker could be determined and accordingly continuously updated proceeding from the current vehicle-in-front position. In the former case, in particular, a corresponding change indicator 7 can be displayed at the same time as the portrayal of the activity of the longitudinal control for achieving the newly set gap. Said change indicator may display the change in the gap as an arrow, for example—wherein the orientation or rather arrow direction may depend on whether the newly set gap is larger or smaller than the previously set gap.

Figure 4:
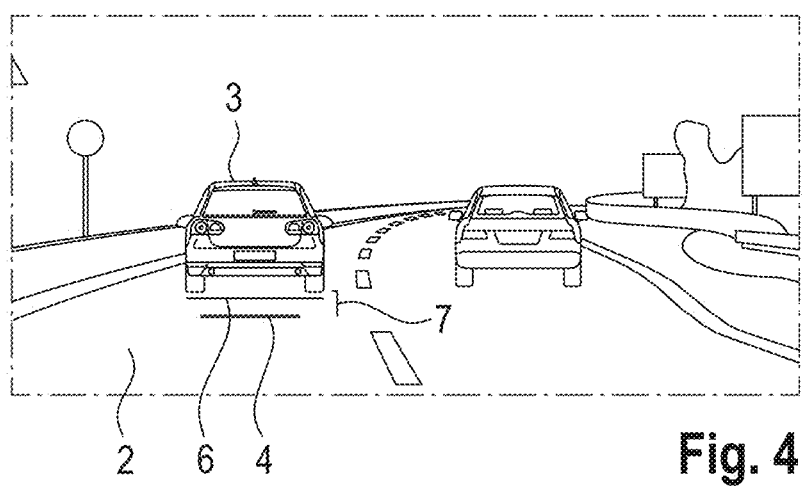
FIG. 4 shows a schematic depiction of the example traffic scene as seen at a later, third point in time.

While the longitudinal control adjusts the newly set gap proceeding from the previous gap, both the previous gap marker 4 and the new gap marker 6 can be displayed at the same time in a method step S14 as depicted here. Meanwhile, in a method step S15, it can be checked whether the new gap, i.e., the newly set control target, has been reached. As long as this is not the case, i.e., while the longitudinal control is still busy with setting or rather achieving the new control target, i.e. the newly set gap according to the corresponding user input, the depiction of the gap markers 4, 6 or at least of the previous gap marker 4 can be adapted dynamically or rather gradually, in particular. In this regard, FIG. 4 is an exemplary schematic depiction of the traffic scene at another later, third point in time. In this case, the newly set gap is closer to being achieved by the longitudinal control and the depiction of the previous gap marker 4 has been adapted accordingly. By way of example, here the size of the previous gap marker 4 is reduced compared with the second point in time and compared with the new gap marker 6.

If it is ascertained in the method step S15 that the new gap, i.e., control target, has been achieved, the previous gap marker 4 can be fully faded out, i.e., deactivated, in a method step S16, in particular gradually. The new gap marker 6 may then accordingly be depicted in a more concise manner, i.e. in particular in the manner in which the previous gap marker 4 was displayed at the first point in time in FIG. 2.

Figure 5:
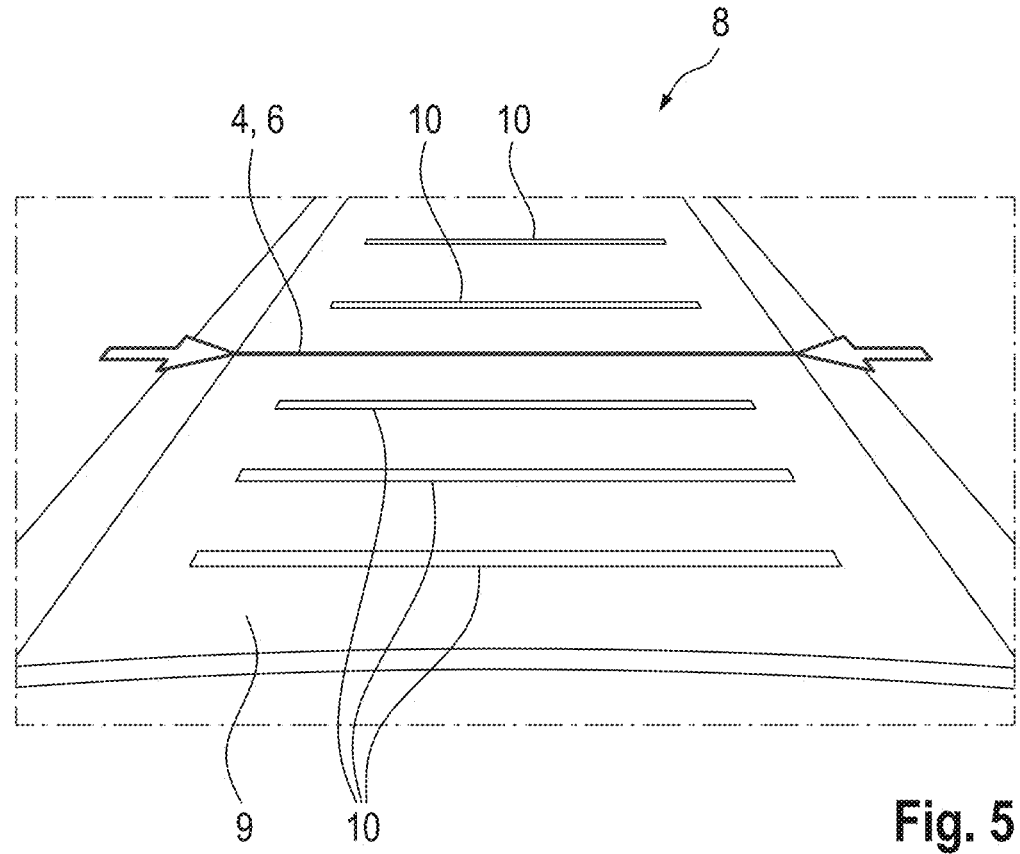
FIG. 5 shows a schematic depiction of an alternative example depiction for illustrating a gap currently set as the control target for the longitudinal control.

If, in the method step S4, no vehicle in front 3 was detected, no corresponding vehicle-in-front position can thus be used as the starting point for determining the display positions. Therefore, as an alternative, in a method step S17, the previous gap marker 4 can initially be displayed or represented in an alternative depiction. An alternative depiction 8 of this kind is indicated schematically and by way of example in FIG. 5. Said FIG. shows an environment model 9, i.e., for example, a schematic depiction or representation of the surroundings, in particular of the road respectively traveled on and lying ahead of the motor vehicle. Multiple possible gaps 10 that can be set in the relevant situation can also be depicted therein. The previous gap marking 4, which indicates or represents the currently set gap, can be highlighted, for example by means of increased conciseness or additional masking elements, for example arrows or the like.

Although this has not been explicitly depicted here for clarity reasons, the possible gaps 10 that can be set in the relevant situation can, in principle, be determined during the method and equally displayed by means of the head-up display, i.e. in the depictions shown in FIG. 2 to 4.

If, for example, no vehicle in front 3 was detected in the method step S9, it is then also possible to jump from there to the method step S17. Then, the new gap set in accordance with the relevant user input can be indicated by accordingly being depicted or highlighted as the new gap marker 6.

On account of the use of the vehicle in front 3 as an anchor as proposed here, a correspondingly robust data base can be accessed for determining the display positions for the gap markers 4, 6 on or in the head-up display, which can lead to a correspondingly robust and stable display of said gap markings 4, 6 by means of the head-up display. Equally, the remaining possible gaps 10 that can be selected or rather set can, in each case, also be reliably displayed.

Overall, the examples described show how contact-analogous display for adjusting gaps within the context of the longitudinal control of a motor vehicle can be realized in a particularly beneficial manner.

LIST OF REFERENCE NUMERALS

1 Flow chart
2 Road
3 Vehicle in front
4 Previous gap marker
Adjustment mode indicator
6 New gap marker
7 Change indicator
8 Alternative depiction
9 Environment model
Possible gaps
S1-S17 Method steps The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or other unit may be arranged to fulfil the functions of several items recited in the claims. Likewise, multiple processors, devices, or other units may be arranged to fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for automated longitudinal control of a motor vehicle, comprising automatically:

ascertaining, by the motor vehicle, a vehicle-in-front position of a vehicle in front driving ahead of the motor vehicle in the travel direction relative thereto;

proceeding from said vehicle-in-front position, determining a display position for a gap marker that appears in constant relative spatial positional relationship relative to the vehicle in front, which display position corresponds to a gap with respect to the vehicle in front currently set as a control target for the longitudinal control;

actuating a head-up display of the motor vehicle to display the gap marker at the ascertained display position;

in response to a user input for setting a changed new gap being detected, setting the new gap as the control target for the longitudinal control, and determining a new display position that is shifted in accordance with the user input proceeding from the vehicle-in-front position and/or a previous display position;

actuating the head-up display to display, in addition to the previous gap marker displayed at the previous display position, a new gap marker at the new display position, such that the new gap marker appears perspectively in front of or behind the previous gap marker from the point of view of the driver depending on whether the new gap is smaller or larger than the previous gap; and when the longitudinal control has achieved the new gap, actuating the head-up display to display only the new gap marker as the only gap marker and not the previous gap marker at the display position that is determined proceeding from the current vehicle-in-front position and that corresponds to the new gap.

2. The method of claim 1, comprising actuating the head-up display and/or another display apparatus to display a predefined graphical representation of the respectively set gap when no vehicle-in-front position can be ascertained when longitudinal control is active.

3. The method of claim 1, comprising actuating the head-up display during simultaneous depiction of the previous gap marker and new gap marker to display the two gap markers with varying degrees of conciseness.

4. The method of claim 1, comprising actuating the head-up display to gradually fade out the previous gap marker when the new gap has been achieved by the longitudinal control.

5. The method of claim 1, comprising, in response to a first actuation of a control element intended for setting the gap being detected, to switch to an adjustment mode without changing the gap, and in the adjustment mode actuating the head-up display to display a predefined indicator for the possibility of adjusting the gap.

6. The method of claim 1, comprising determining all possible gaps and providing a selection of all possible gaps.

7. The method of claim 6, comprising in response to a first actuation of a control element intended for setting the gap being detected, to actuate the head-up display to simultaneously display all possible gaps that can be set in each case.

8. The method of claim 6, comprising actuating the head-up display to display the possible gaps that can be set only in response to a user input for setting the changed new gap being detected.

9. An assistance system for a motor vehicle, wherein the assistance system is configured to automatically: continuously ascertain a current relative vehicle-in-front position of a vehicle in front driving ahead in the travel direction;

determine, proceeding from said vehicle-in-front position, a display position for a gap marker that appears in constant relative spatial positional relationship relative to the vehicle in front, which display position corresponds to a gap with respect to the vehicle in front currently set as a control target for automated longitudinal control of the motor vehicle;

actuate a head-up display to display the gap marker at the ascertained display;

determine, in response to a user input for setting a changed new gap being detected, a new display position that is shifted in accordance with the user input proceeding from the vehicle-in-front position and/or a previous display position;

actuate the head-up display to display, in addition to the previous gap marker displayed at the previous display position, a new gap marker at the new display position, such that the new gap marker appears perspectively in front of or behind the previous gap marker from the point of view of the driver depending on whether the new gap is smaller or larger than the previous gap; and to actuate the head-up display, when the longitudinal control achieves the new gap, to display only the new gap marker as the only gap marker and not the previous gap marker anymore at the display position that is determined proceeding from the current vehicle-in-front position and that corresponds to the new gap.

10. The assistance system of claim 9, wherein the assistance system is configured to actuate the head-up display and/or another display apparatus to display a predefined graphical representation of the respectively set gap when no vehicle-in-front position can be ascertained when longitudinal control is active.

11. The assistance system of claim 9, wherein the assistance system is configured to actuate the head-up display in each case, during simultaneous depiction of the previous gap marker and new gap marker, to display these two gap markers with varying degrees of conciseness.

12. The assistance system of claim 9, wherein the assistance system is configured to actuate the head-up display in each case to gradually fade out the previous gap marker when the new gap has been achieved by the longitudinal control.

13. The assistance system of claim 9, wherein the assistance system is configured, in response to a first actuation of a control element intended for setting the gap being detected, to switch to an adjustment mode without changing the gap, and in the adjustment mode to actuate the head-up display to display a predefined indicator for the possibility of adjusting the gap.

14. The assistance system of claim 9, wherein the assistance system is configured to determine all possible gaps in each case and to provide same for selection.

15. The assistance system of claim 14, wherein the assistance system is configured, in each case in response to a first actuation of a control element intended for setting the gap being detected, to actuate the head-up display to simultaneously display all possible gaps that can be set in each case.

16. The assistance system of claim 14, wherein the assistance system is configured to actuate the head-up display to display the possible gaps that can be set in each case only in response to a user input for setting the changed new gap being detected.

17. A motor vehicle, which is configured for automated longitudinal control and comprises a head-up display and an assistance system for a motor vehicle, wherein the assistance system is configured to automatically:

continuously ascertain a current relative vehicle-in-front position of a vehicle in front driving ahead in the travel direction, determine, proceeding from said vehicle-in-front position, a display position for a gap marker that appears in constant relative spatial positional relationship relative to the vehicle in front, which display position corresponds to a gap with respect to the vehicle in front currently set as a control target for automated longitudinal control of the motor vehicle;

actuate a head-up display to display the gap marker at the ascertained display;

determine, in response to a user input for setting a changed new gap being detected, a new display position that is shifted in accordance with the user input proceeding from the vehicle-in-front position and/or a previous display position;

actuate the head-up display to a display, in addition to the previous gap marker displayed at the previous display position, a new gap marker at the new display position, such that the new gap marker appears perspectively in front of or behind the previous gap marker from the point of view of the driver depending on whether the new gap is smaller or larger than the previous gap; and to actuate the head-up display, when the longitudinal control achieves the new gap, to display only the new gap marker gap marker and not the previous gap marker anymore at the display position that is determined proceeding from the current vehicle-in-front position and that corresponds to the new gap.

\* \* \* \* \*